(12) United States Patent
Williams

(10) Patent No.: US 10,320,434 B2
(45) Date of Patent: Jun. 11, 2019

(54) CB RADIO SYSTEM

(71) Applicant: Daryle Williams, Austin, TX (US)

(72) Inventor: Daryle Williams, Austin, TX (US)

(*) Notice: Subject to any disclaimer, the term of this patent is extended or adjusted under 35 U.S.C. 154(b) by 0 days.

(21) Appl. No.: 15/899,993

(22) Filed: Feb. 20, 2018

(65) Prior Publication Data

US 2018/0241426 A1 Aug. 23, 2018

Related U.S. Application Data

(60) Provisional application No. 62/600,453, filed on Feb. 22, 2017.

(51) Int. Cl.
| | | |
|---|---|---|
| *H04M 3/00* | (2006.01) | |
| *H04B 1/3822* | (2015.01) | |
| *H04W 4/40* | (2018.01) | |
| *H04M 1/725* | (2006.01) | |
| *H04M 1/60* | (2006.01) | |
| *H04W 84/00* | (2009.01) | |

(52) U.S. Cl.
CPC ........ *H04B 1/3822* (2013.01); *H04M 1/6091* (2013.01); *H04M 1/72563* (2013.01); *H04W 4/40* (2018.02); *H04M 2201/40* (2013.01); *H04W 84/005* (2013.01)

(58) Field of Classification Search
USPC ............. 455/90.2, 41.3, 416, 67.7; 340/90.1, 340/90.2, 632
See application file for complete search history.

(56) References Cited

U.S. PATENT DOCUMENTS

| | | | | |
|---|---|---|---|---|
| 4,264,979 A | * | 4/1981 | Gutowski | H04B 1/3822 116/263 |
| 5,406,265 A | * | 4/1995 | Trozzo | G01N 33/0009 340/632 |
| 6,696,976 B1 | * | 2/2004 | Hansen | G08G 1/162 340/901 |
| D598,001 S | | 8/2009 | Peng | |
| 8,078,120 B2 | * | 12/2011 | Sandoval | H04M 1/6066 455/90.2 |
| 8,311,546 B2 | | 11/2012 | Boudreau et al. | |
| 9,060,381 B2 | * | 6/2015 | Tarte | H04N 21/41422 |
| 9,803,335 B1 | * | 10/2017 | Myers | E02F 9/2004 |
| 2003/0046084 A1 | * | 3/2003 | Wyman | G10L 15/24 704/275 |
| 2005/0277445 A1 | | 12/2005 | Bae | |

(Continued)

*Primary Examiner* — David Q Nguyen

(57) ABSTRACT

A CB radio system includes a wireless communication network. A citizens band radio is provided and the citizens band radio is positioned within a vehicle. The citizens band radio has a plurality of standing wave ratios programmed therein. An antenna is provided and the antenna is coupled to an outer surface of the vehicle and the antenna is electrically coupled to the citizens band radio. Moreover, the antenna is tunable to operate on a selected one of the standing wave ratios. The antenna is placed in selective electrical communication with the wireless communication network thereby increasing an effective range of the citizens band radio. A microphone is positioned within the vehicle thereby facilitating the microphone to detect spoken commands. The microphone is electrically coupled to the citizens band radio such that the microphone controls operational parameters of the citizens band radio.

6 Claims, 4 Drawing Sheets

(56) References Cited

U.S. PATENT DOCUMENTS

| | | | |
|---|---|---|---|
| 2007/0021052 A1 | 1/2007 | Boice | |
| 2008/0233895 A1* | 9/2008 | Bizer | H04W 84/10 |
| | | | 455/90.2 |
| 2009/0203319 A1* | 8/2009 | Sandoval | H04M 1/6066 |
| | | | 455/41.3 |
| 2011/0121991 A1* | 5/2011 | Basir | G08G 1/0962 |
| | | | 340/902 |
| 2011/0300840 A1* | 12/2011 | Basir | G10L 15/265 |
| | | | 455/416 |
| 2013/0171942 A1* | 7/2013 | Christofferson | H04H 20/12 |
| | | | 455/67.7 |

* cited by examiner

US 10,320,434 B2

CB RADIO SYSTEM

CROSS-REFERENCE TO RELATED APPLICATIONS

I hereby claim the benefit under 35 U.S.C. Section 119(e) of U.S. Provisional application 62/600,453 filed on Feb. 22, 2017.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to radio devices and more particularly pertains to a new radio device for increasing effective range of a citizens band radio.

BRIEF SUMMARY OF THE INVENTION

An embodiment of the disclosure meets the needs presented above by generally comprising a wireless communication network. A citizens band radio is provided and the citizens band radio is positioned within a vehicle. The citizens band radio has a plurality of standing wave ratios programmed therein. An antenna is provided and the antenna is coupled to an outer surface of the vehicle and the antenna is electrically coupled to the citizens band radio. Moreover, the antenna is tunable to operate on a selected one of the standing wave ratios. The antenna is placed in selective electrical communication with the wireless communication network thereby increasing an effective range of the citizens band radio. A microphone is positioned within the vehicle thereby facilitating the microphone to detect spoken commands. The microphone is electrically coupled to the citizens band radio such that the microphone controls operational parameters of the citizens band radio.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
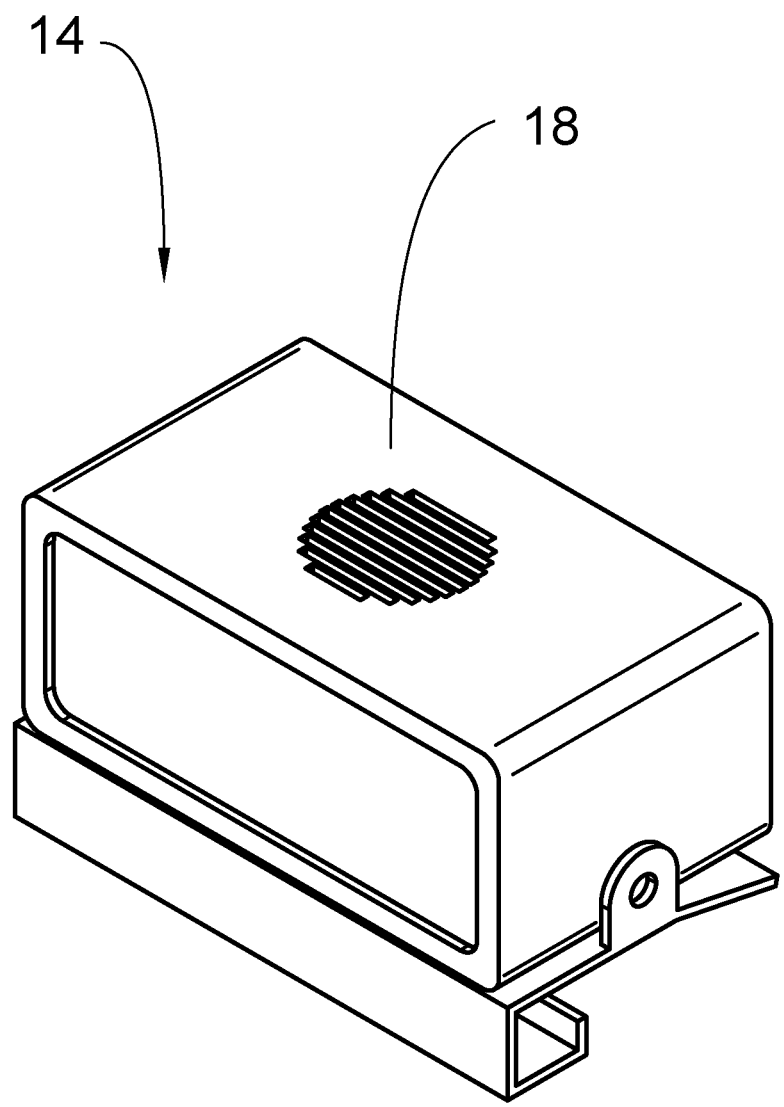
FIG. 1 is a perspective view of a citizens band radio of a CB radio system according to an embodiment of the disclosure.
Figure 2:
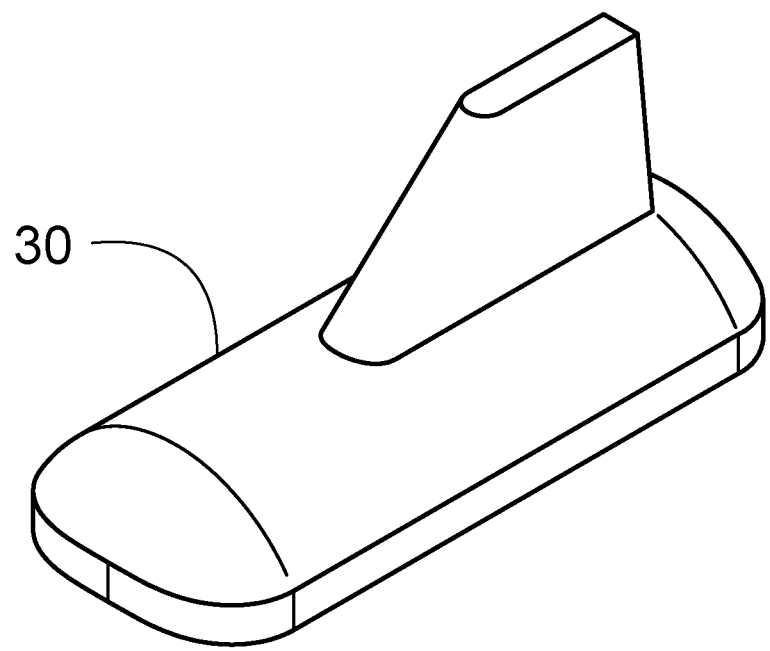
FIG. 2 is perspective view of an antenna of an embodiment of the disclosure.
Figure 3:
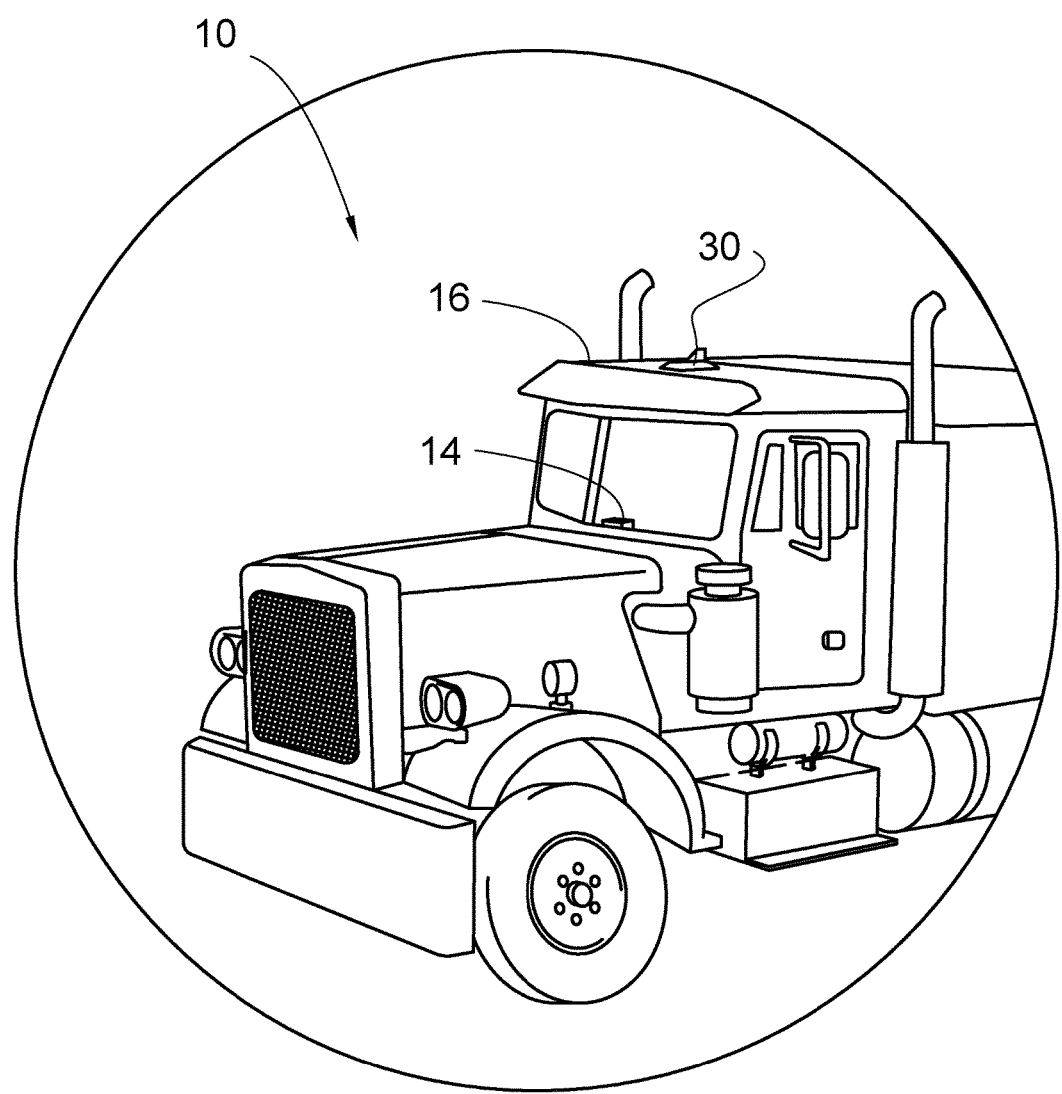
FIG. 3 is a perspective in-use view of an embodiment of the disclosure.
Figure 4:
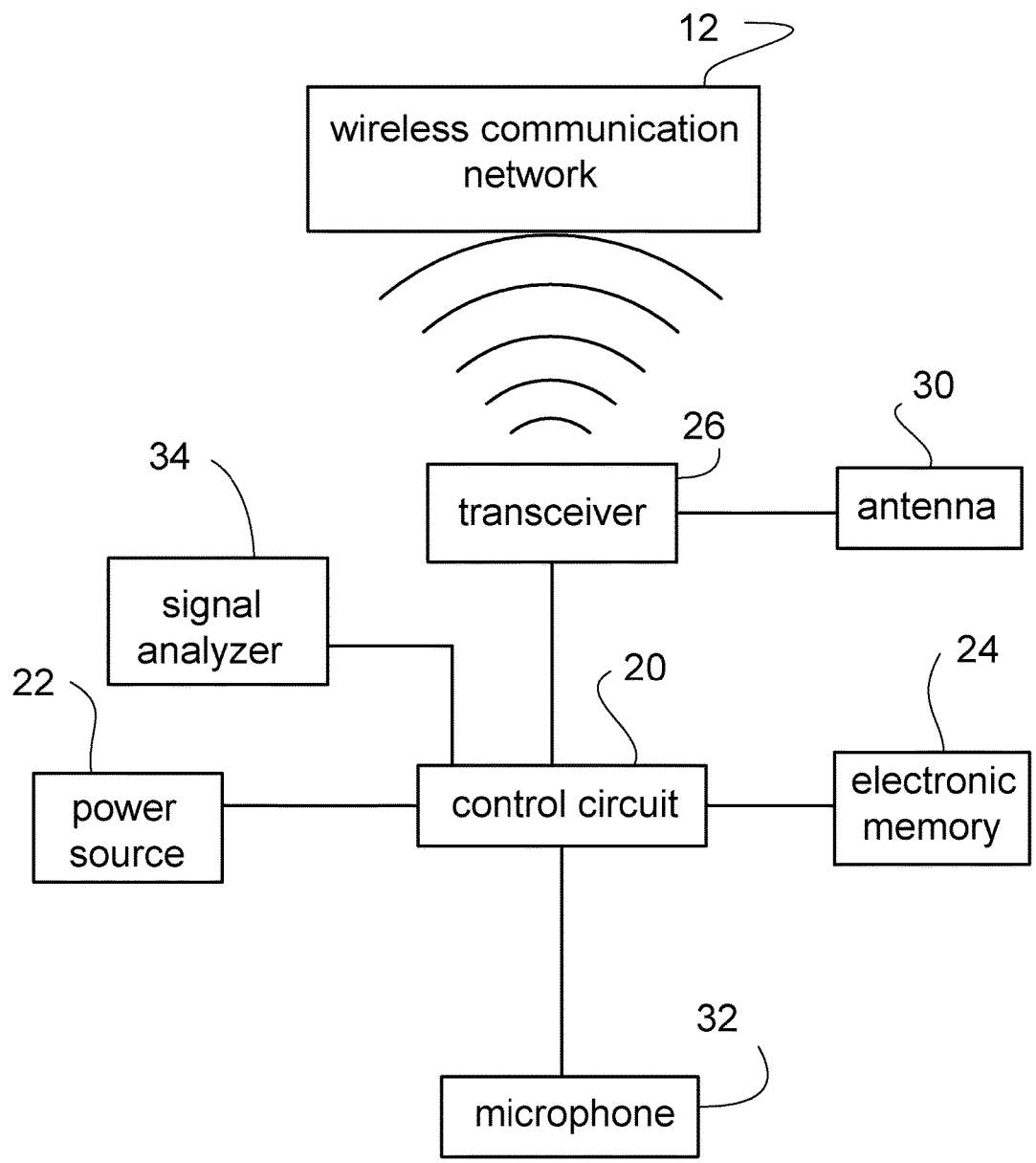
FIG. 4 is a schematic view of an embodiment of the disclosure.

With reference now to the drawings, and in particular to FIGS. 1 through 4 thereof, a new radio device embodying the principles and concepts of an embodiment of the disclosure and generally designated by the reference numeral 10 will be described.

As best illustrated in FIGS. 1 through 4, the CB radio system 10 generally comprises a wireless communication network 12, such as a cellular phone network or the like. A citizens band radio 14 is provided and the citizens band radio 14 is within a vehicle 16, such as a semi tractor or the like. Additionally, the citizens band radio 14 has a plurality of standing wave ratios programmed therein.

The citizens band radio 14 comprises a housing 18 that is positioned within the vehicle 16 and a control circuit 20 that is positioned within the housing 18. The control circuit 20 is electrically coupled to a power source 22 comprising an electrical system of the vehicle 16. An electronic memory 24 is positioned within the housing 18 and the electronic memory 24 is electrically coupled to the control circuit 20. The electronic memory 24 stores data corresponding to a plurality of predetermined standing wave ratios. The standing wave ratios stored in the electronic memory 24 are determined by a manufacturer of the citizens band radio 14 and the standing wave ratios correspond to a the performance requirements of an end-user of the citizens band radio 14. Additionally, the electronic memory 24 stores data corresponding to a plurality of spoken commands.

A transceiver 26 is positioned within the housing 18 and the transceiver 26 is electrically coupled to the control circuit 20. The transceiver 26 is programmable to operate on a selected one of the plurality of standing wave ratios stored in the electronic memory 24. The transceiver 26 may be a radio frequency transceiver 26 or the like. Additionally, the transceiver 26 is capable of selectively and wirelessly communicating with the wireless communication network 12. A display 28 is coupled to the housing 18 such that the display 28 is visible to a user. The display 28 is electrically coupled the control circuit 20 and the display 28 displays indicia corresponding to operational parameters of the control circuit 20. The display 28 may be an LCD or the like.

An antenna 30 is provided and the antenna 30 is coupled to an outer surface of the vehicle 16. The antenna 30 is electrically coupled to the citizens band radio 14 via a conductor or the like. Additionally, the antenna 30 is tunable to operate on a selected one of the standing wave ratios. The antenna 30 is placed in selective electrical communication with the wireless communication network 12 thereby increasing an effective range of the citizens band radio 14. The antenna 30 is electrically coupled to the control circuit 20 and the antenna 30 may include a signal amplifier that has a maximum output power of 4.0 watts. In this way the antenna 30 conforms to transmission power laws with respect to citizen band radio.

A microphone 32 is positioned within the vehicle 16 thereby facilitating the microphone 32 to detect spoken commands. The microphone 32 is electrically coupled to the citizens band radio 14 such that the microphone 32 controls operational parameters of the citizens band radio 14. Additionally, the microphone 32 is electrically coupled to the control circuit 20. In this way the control circuit 20 responds to spoken commands that correspond to the spoken commands stored within the electronic memory 24.

A signal analyzer 34 is provided and the signal analyzer 34 is positioned within the housing 18 and is electrically coupled to the control circuit 20. The signal analyzer 34 analyzes a signal received by the antenna 30 from remote citizens band radio 14. The control circuit 20 selects one of the standing wave ratios stored in the electronic memory 24 that will facilitate optimum two way communication with the remote citizens band radio 14. Additionally, the transceiver 26 is placed in wireless communication with the wireless communication network 12 when the signal analyzer 34 determines that the remote citizens band radio 14 is too far away from the vehicle 16 for effective communication between the citizens band radio 14 in the vehicle 16 and the remote citizens band radio 14. In this way the effective range of the citizens band radio 14 in the vehicle 16 is increased to at least 150.0 miles.

In use, the standing wave ratios are programmed into the electronic memory 24 during manufacture to be in accordance with the end user's operational requirements. The control circuit 20 selects one of the standing wave ratios for transmission that will maximize two way communications between the citizens band radio 14 in the vehicle 16 and the remote citizens band radio 14. Additionally, the antenna 30 is tuned to operate on the selected standing wave ratio. The transceiver 26 is placed into wireless communication with the wireless communication network 12 when the signal analyzer 34 determines that the signal received from the remote citizens band radio 14 is too weak for effective communication. In this way the wireless communication network 12 is employed as a repeater for the citizens band radio 14 in the vehicle 16 and the remote citizens band radio 14. Thus, the effective range of the citizens band radio 14 in the vehicle 16 is increased to at least 150.0 miles.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A CB radio system having an enhanced range of communication, said system comprising:
    a wireless communication network;
    a citizens band radio being configured to be positioned within a vehicle, said citizens band radio having a plurality of standing wave ratios programmed therein, said citizens band radio comprising
        a housing being configured to be positioned within the vehicle, and
        a control circuit being positioned within said housing, said control circuit being configured to be electrically coupled to a power source comprising an electrical system of the vehicle, and
        a signal analyzer being operationally coupled to said control circuit for facilitating said control circuit to select one of said plurality of standing wave ratios for operation of said citizens band radio;
    an antenna being configured to be coupled to an outer surface of the vehicle, said antenna being electrically coupled to said citizens band radio, said antenna being tunable to operate on a selected one of said standing wave ratios, said antenna being placed in selective electrical communication with said wireless communication network by said control circuit when said signal analyzer detects no effective communication through any of said predetermined wave ratios thereby increasing an effective range of said citizens band radio; and
    a microphone being configured to be positioned within the vehicle thereby facilitating said microphone to detect spoken commands, said microphone being electrically coupled to said citizens band radio such that said microphone controls operational parameters of said citizens band radio.

2. The system according to claim 1, further comprising an electronic memory being positioned within said housing, said electronic memory being electrically coupled to said control circuit, said electronic memory storing data corresponding to a plurality of predetermined standing wave ratios, said electronic memory storing data corresponding to a plurality of spoken commands.

3. The system according to claim 2, further comprising a transceiver being positioned within said housing, said transceiver being electrically coupled to said control circuit, said transceiver being programmable to operate on a selected one of said plurality of standing wave ratios stored in said electronic memory.

4. The system according to claim 3, further comprising a display being coupled to said housing wherein said display is configured to be visible to a user, said display being electrically coupled said control circuit such that said display displays indicia corresponding to operational parameters of said control circuit.

5. The system according to claim 2, wherein said microphone being electrically coupled to said control circuit such that said control circuit responds to spoken commands that correspond to the spoken commands stored within said electronic memory.

6. A CB radio system having an enhanced range of communication, said system comprising:

a wireless communication network;

a citizens band radio being configured to be positioned within a vehicle, said citizens band radio having a plurality of standing wave ratios programmed therein, said citizens band radio comprising:

a housing being configured to be positioned within the vehicle;

a control circuit being positioned within said housing, said control circuit being configured to be electrically coupled to a power source comprising an electrical system of the vehicle;

an electronic memory being positioned within said housing, said electronic memory being electrically coupled to said control circuit, said electronic memory storing data corresponding to a plurality of predetermined standing wave ratios, said electronic memory storing data corresponding to a plurality of spoken commands;

a transceiver being positioned within said housing, said transceiver being electrically coupled to said control circuit, said transceiver being programmable to operate on a selected one of said plurality of standing wave ratios stored in said electronic memory;

a signal analyzer being operationally coupled to said control circuit for facilitating said control circuit to select one of said plurality of standing wave ratios for operation of said citizens band radio; and a display being coupled to said housing wherein said display is configured to be visible to a user, said display being electrically coupled said control circuit such that said display displays indicia corresponding to operational parameters of said control circuit;

an antenna being configured to be coupled to an outer surface of the vehicle, said antenna being electrically coupled to said citizens band radio, said antenna being tunable to operate on a selected one of said standing wave ratios, said antenna being placed in selective electrical communication with said wireless communication network by said control circuit when said signal analyzer detects no effective communication through any of said predetermined wave ratios thereby increasing an effective range of said citizens band radio, said antenna being electrically coupled to said control circuit; and a microphone being configured to be positioned within the vehicle thereby facilitating said microphone to detect spoken commands, said microphone being electrically coupled to said citizens band radio such that said microphone controls operational parameters of said citizens band radio, said microphone being electrically coupled to said control circuit such that said control circuit responds to spoken commands that correspond to the spoken commands stored within said electronic memory.

\* \* \* \* \*